E. G. SAMPSON & G. JOHNSON.
SUSPENSION DEVICE FOR DRAWERS.
APPLICATION FILED FEB. 17, 1915.
1,227,939.
Patented May 29, 1917.
2 SHEETS—SHEET 2.
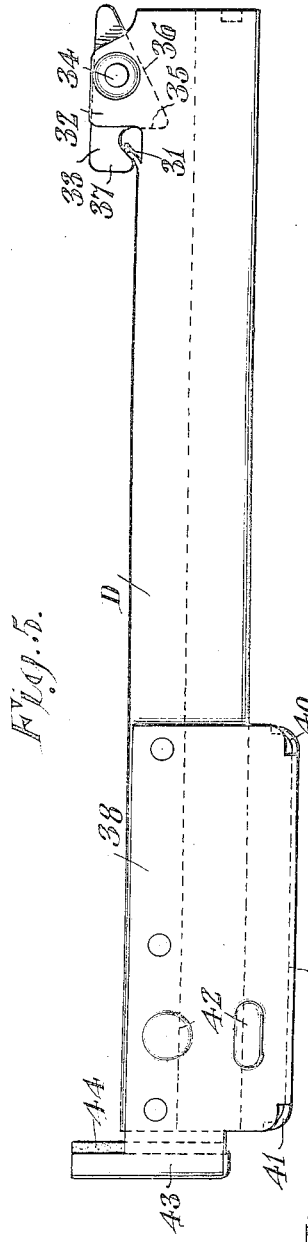
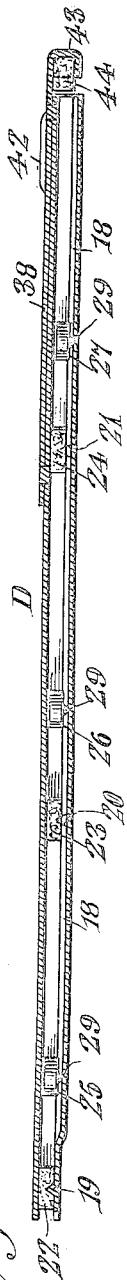
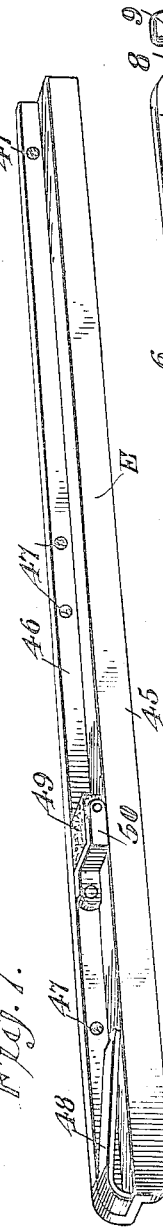
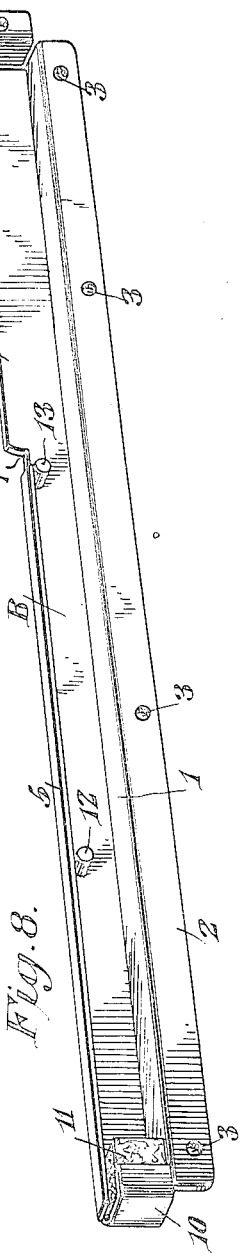
Witnesses
Erick G. Sampson, Inventors
Gustaf Johnson,
By
Attorney

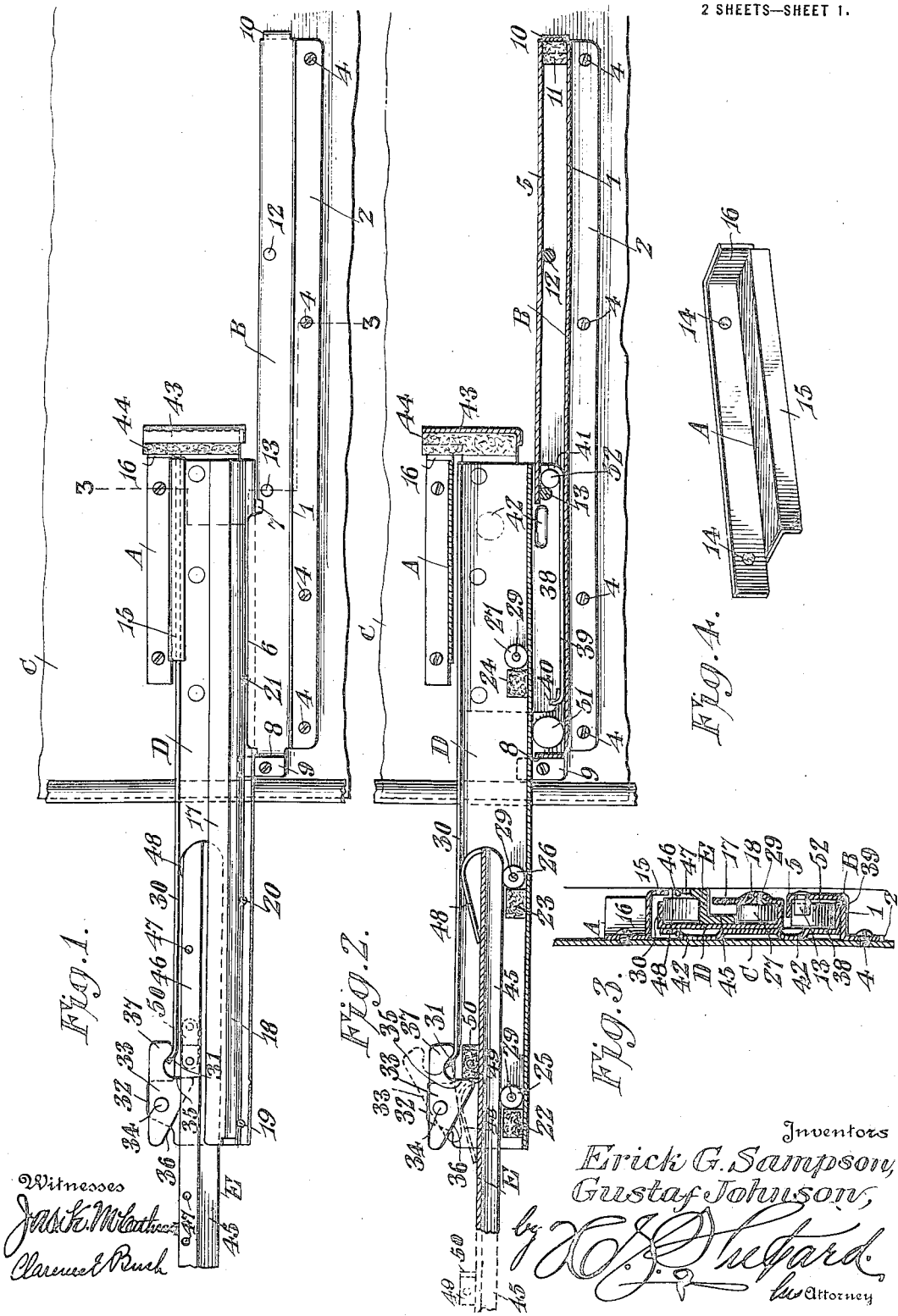

UNITED STATES PATENT OFFICE.

ERICK GOTFRED SAMPSON AND GUSTAF JOHNSON, OF JAMESTOWN, NEW YORK, ASSIGNORS TO THE ART METAL CONSTRUCTION COMPANY, OF JAMESTOWN, NEW YORK, A CORPORATION OF MASSACHUSETTS.

SUSPENSION DEVICE FOR DRAWERS.

1,227,939.　　　　Specification of Letters Patent.　　Patented May 29, 1917.

Application filed February 17, 1915. Serial No. 8,815.

*To all whom it may concern:*

Be it known that we, ERICK GOTFRED SAMPSON and GUSTAF JOHNSON, citizens of the United States, residing at Jamestown, in the county of Chautauqua and State of New York, have invented certain new and useful Improvements in Suspension Devices for Drawers, of which the following is a specification.

This invention is a suspension device for the drawers of cabinets, file cases, etc., and is an improvement upon Patent No. 884,476, April 14, 1908, to E. A. Ekedahl and E. G. Sampson.

The prior device, as well as the present device, includes loose or floating anti-friction rollers, and it is an important object of the present invention to prevent certain of such rollers from becoming displaced from the device during transportation and handling, and to accomplish this result without interfering in any manner whatsoever with the free rotation of said rollers.

A further object of the invention is to provide an improved dog arrangement whereby outward movement of the drawer upon the suspension device is limited, and also whereby the drawer may be released from the suspension device in order that it may be entirely removed therefrom. In this connection, it is also proposed to arrange for the convenient re-assemblage of the drawer with the suspension device.

With these and other objects in view, the present invention consists in the combination and arrangement of parts, as will be hereinafter more fully described, shown in the drawings, and particularly set forth in the appended claims, it being understood that changes in the form, proportion, size and minor details may be made, within the scope of the claims, without departing from the spirit or sacrificing any of the advantages of the invention.

In the drawings,

Figure 1 is a side elevation of a suspension device for drawers embodying the features of the present invention, and shown at the limit of its forward extension.

Fig. 2 is a vertical longitudinal sectional view thereof.

Fig. 3 is an enlarged cross-sectional view taken on the line 3—3 of Fig. 1.

Fig. 4 is a detail perspective view of the upper guideway member.

Fig. 5 is an enlarged detail elevation looking at the reverse side of the suspension member.

Fig. 6 is a longitudinal sectional view of Fig. 5, the suspension member being in the position shown in Figs. 1 and 2 of the drawings.

Fig. 7 is a detail perspective view of the drawer rail member.

Fig. 8 is a detail perspective view of the lower guideway member.

Like characters of reference designate corresponding parts on each of the figures of the drawings.

The present device includes a guideway made up of an upper stationary member A and a lower stationary member B, each of the members being suitably connected to an upright or side wall C of a cabinet, file case or the like.

The lower guide member B is in the form of a channel bar, as best illustrated in Figs. 3 and 8 of the drawings. This channel bar has a substantially horizontal bottom 1 which is of full width throughout its length and extends throughout the length of the entire bar and is provided at its inner edge with a depending flange 2 having suitable openings 3 for the reception of fastening devices, such as shown at 4, in Figs. 1, 2 and 3 of the drawings, whereby the guideway member may be secured to the wall C with the open side of the channel bar toward and closed by the upright C. The top 5 of the channel bar is of less width than the bottom thereof and is terminated short of the front end of the bar, the body portion of the bar in front of the top member 5 being extended upwardly to form an upright flange 6, the parts 5 and 6 being separated by a notch or space 7. The front end of the bar is bent laterally to form an end wall 8 to close the open end of the channel, and the extremity of this wall is bent to form an attaching ear 9 perforated to receive a suitable fastening. The rear end of the bar is closed by an end wall 10 which embraces a piece of leather, felt or the like 11, constituting a stop and a noise-deadening device, as will hereinafter appear. At suitable intervals, studs or pins 12 and 13 project from the upright wall of the channel bar toward the open side thereof, said studs being immediately beneath the top portion 5 of the bar.

The guideway member A is secured to the upright or side wall C a suitable distance above the front portion of the guideway member B, the upright wall of the member A being perforated, as at 14, to receive fastenings for securing the member to the upright C. The member A is in the form of an angle bar having a longitudinal depending flange 15 along the outer edge of the bottom of the bar, the upright wall of the bar, at its rear end, being bent across the bar, as at 16, to form a stop, as will be hereinafter explained.

The suspension member of the device is designated D, and is in the form of a channel bar, the bottom of which is provided on the open side of the bar with an upstanding flange 17 extending throughout the entire length of the bar, and this flange is provided throughout its length with an internal channel 18 formed by striking up a hollow rib in the flange 17. At suitable intervals punch pricks 19, 20 and 21, are formed in the lower edge portion of the channel 18 so as to punch metal into the channel and force said metal into blocks of leather, felt or the like 22, 23 and 24, which latter constitute sound-deadening stops for anti-friction rollers 25, 26 and 27. Each of these rollers is provided with an axially-disposed conical stud or projection 29 which is received within the channel 18, whereby said anti-friction rollers are prevented from becoming accidentally displaced upwardly through the open top of the channel bar suspension member. The top 30 of the suspension member terminates short of the front of the member in an upwardly and forwardly inclined lip 31, and in front of this lip, the upright wall of the member is extended, as at 32, and supports a dog 33 which is pivoted between its ends, as at 34, upon the extension 32. This dog is substantially triangular in shape and is provided with a depending shoulder 35 immediately in front of the lip 31, from which shoulder the lower edge of the dog is beveled or inclined upwardly and forwardly, as at 36. The dog is extended in rear of the shoulder 35 at the top thereof, as at 37, to form a weight overbalancing the forward end portion of the dog and normally holding the same in a substantially horizontal position with the weight portion 37 engaging the lip 31, as a stop. At the rear of the suspension member D and on the closed side thereof, there is attached a plate 38 which projects below the member and is provided with a bottom substantially horizontal flange 39, the ends 40 and 41 of which are turned upwardly to form stops. Suitable bosses or projections 42 are pressed outwardly in the plate 38 to form spacing devices designed to engage the upright or wall C, as best illustrated in Fig. 3 of the drawings, so as to properly space the suspension member from the upright wall of the case or cabinet. The plate 38 extends slightly in rear of the suspension member and is provided with an upstanding channel portion 43 inclosing a filling 44 of felt, leather or the like, which projects above the top of the member and constitutes a stop to engage the stop flange 16 on the upper guideway member A and thereby limit the forward movement of the suspension member.

Working within the suspension member is a drawer rail E, shown in detail in Fig. 7 of the drawings. This drawer rail is in the form of a Z-bar, the bottom edge of its lower flange 45 resting upon the anti-friction rollers 25, 26 and 27, while its upper flange member 46 is provided with suitable perforations 47 for the reception of fastenings whereby the rail may be secured to the adjacent side of a drawer. This drawer rail is adapted to be slipped endwise into the suspension member through the open front thereof and beneath the dog, the inner end of the rail being provided with a bearing member 48 underlying the top flange of the suspension member and suitably secured to the rail and lying on top of the horizontal body portion thereof. This bearing has a rounded or beveled rear extremity to engage the beveled edge 36 of the dog and move the latter upwardly when the rail is pushed into the suspension member, while the forward portion of the bearing is also beveled or inclined so as to wipe across the lower edge of the shoulder 35 of the dog and lift the same to permit withdrawal of the rail. Accidental or unintentional removal of the rail is prevented by a stop 49 provided upon the rail a short distance in front of the bearing 48, said stop being adapted to engage against the rear face of the shoulder 35 on the dog and thereby prevent accidental displacement of the rail. By pressing downwardly upon the forward free end of the dog, the latter may be tilted into the inclined position shown in Fig. 2, whereupon the rail is free to be removed. The normal position of the dog is shown in full lines, and is maintained in this position by the weighted rear terminal 37 of the dog. The stop 49 is preferably a block of leather, felt or other noise-deadening material, and is held in place by means of a Z-clip or bracket 50 suitably secured to the rail and embracing the rear end and outer side of the stop block 49.

In setting up or assembling the device, a floating anti-friction roller 51 is placed in the forward portion of the guideway member B in front of the stop stud 13, and another smaller floating roller 52 is placed in the hanger constituted by the lower flanged portion of the plate 38 on the suspension D, and then the guideway member B and the suspension member D are assembled so as to bring the roller 52 into the channel of the member B between the stop studs 12 and 13, with the forward portion of the suspension member on top of the roller 51. In this position, the two members are applied to the upright C, and fastenings 4 are passed through the perforations 3 at the bottom of the guideway member so as to secure the latter to the upright. The upper guideway member A is then secured to the upright C with its depending flange 15 depending across the top flange 30 of the suspension member, whereby the latter is supported in place and may be moved back and forth in the guideway. The anti-friction roller 51 takes the weight of the suspension member, while the anti-friction-roller 52 mounted in the hanger 38 travels beneath the top flange 5 of the lower guideway member and prevents upward tilting of the rear end of the suspension member. The drawer rail E is then pushed inwardly through the open end of the suspension member D and is supported upon the anti-friction rollers 25, 26 and 27. It will now be noted that the bearing member 48 underlies the top flange 30 of the suspension member and thereby prevents vertical tilting of the rail member within the suspension member.

It will, of course, be understood that two suspension devices, as herein described, are employed, one at each side of the drawer, with the suspension rails secured to the respective sides of the drawer, whereby the drawer may be readily assembled with and removed from a pair of suspension devices through the medium of the dogs at the front ends of the suspension members, as hereinbefore described. Each suspension member D travels in or telescopes the stationary guideway made up of the members A and B, while the drawer rail E travels upon or telescopes the suspension member D, whereby the drawer may be pulled out to a full open position and will be held in that position without danger of tilting. The inward or rearward movement of the suspension member D is limited by having the rear end of the carrier 38 strike against the stop 11 at the rear end of the guideway member B, while its forward movement is limited by the stop 44 on the rear end of the suspension member coming into engagement with the rear end of the stationary upper guide member A. The drawer rail is limited in its outward movement by the dog 33, and its inward movement is limited by the stop 44 against which the inner end of the rail engages, and thereafter the rail and the suspension member move together in a rearward direction until the suspension member is stopped by coming into contact with the stop 11. It will here be noted that the path of travel of the anti-friction roller 51 is limited by the stop 12 and the front end 8 of the stationary guide member B, while the travel of the anti-friction roller 52 is limited by the upstanding shoulders 40 and 41 on the hanger 38. Furthermore, the stops 12 and 13 limit the travel of the anti-friction roller 52 in the channel of the lower guideway member B, whereby the anti-friction rollers 51 and 52 always remain between certain limits so as to obtain the most effective anti-friction support for the suspension-member D. The anti-friction rollers 25, 26 and 27 are also limited in their travel by the stops 22, 23 and 24, the stop member 44 also constituting a rear stop for the anti-friction roller 27.

Having thus described the invention, what is claimed, is:—

1. A suspension device for drawers including a suspension member, a drawer rail slidable thereon, a stop element upon the drawer rail, a dog mounted upon the forward portion of the suspension member in the forward path of the stop element, said dog capable of being moved out of the path of the stop element to permit withdrawal of the drawer rail, the rear end of the drawer rail being provided with a bearing for coöperation with the suspension member, the front and rear end portions of the bearing being beveled or inclined to trip the dog when passing therebeneath in each direction of movement of the drawer rail.

2. A suspension device for drawers including a channel bar suspension member, the front portion of the upper flange of the channel bar being omitted, and said bar being provided with an upward extension where the flange portion is omitted, a dog pivoted to the extension and having a shoulder extending into the channel bar, said dog having a rearward extension overhanging the suspension member and constituting a weight to hold the dog in its normal position, the forward end portion of the top flange of the suspension member constituting a stop for engagement by the rear extension of the dog, the lower edge of the dog being inclined upwardly and forwardly from the lower end of the shoulder on the dog, and a drawer rail slidable within the channel bar and provided with a stop shoulder for engagement with the shoulder on the dog, and a bearing device on the rear end portion of the drawer rail underlying the top flange of the suspension member and having front and rear beveled ends to wipe beneath the dog and trip the same.

3. A suspension device for drawers including a channel bar suspension member, the bottom of the channel bar having an upstanding flange provided with a longitudinal channel in its inner face, a drawer rail slidable in the channel bar, and a floating anti-friction roller traveling upon its periphery within the channel bar and supporting the drawer rail on the periphery of the roller, said roller having an axial stud traveling loosely in the channel in the flange to prevent lateral displacement of the roller.

4. As a new article of manufacture, a suspension member of the character described consisting of a channel bar having a flange rising from the bottom flange of the bar, said upstanding flange having a longitudinal groove pressed therein on the inner face thereof.

5. A drawer rail of the character described comprising a Z-bar provided at its rear end with a bearing member located in one of the angles of the bar and having its front and rear portions beveled longitudinally.

In testimony whereof we affix our signatures in presence of two witnesses.

ERICK GOTFRED SAMPSON.
GUSTAF JOHNSON.

Witnesses:
   ABIAH D. DREYER,
   R. T. FISHER.